United States Patent
Bottomley et al.

(10) Patent No.: US 8,082,542 B2
(45) Date of Patent: Dec. 20, 2011

(54) LOAD TIME IN-LINING OF SUBROUTINES

(75) Inventors: Thomas Mark Walter Bottomley, Orleans (CA); Peter Wiebe Burka, Ottawa (CA); Jeffrey Michael Disher, Ottawa (CA); Karl Michael Taylor, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1462 days.

(21) Appl. No.: 11/538,594

(22) Filed: Oct. 4, 2006

(65) Prior Publication Data

US 2008/0127147 A1  May 29, 2008

(51) Int. Cl.
*G06F 9/45* (2006.01)
(52) U.S. Cl. ....................................................... 717/148
(58) Field of Classification Search .................... 717/151
See application file for complete search history.

(56) References Cited

U.S. PATENT DOCUMENTS

| | | | | |
|---|---|---|---|---|
| 6,971,091 B1 * | 11/2005 | Arnold et al. | ................ | 717/145 |
| 7,058,929 B2 * | 6/2006 | Charnell et al. | ............. | 717/135 |
| 2002/0049865 A1 * | 4/2002 | Charnell et al. | ............. | 709/315 |
| 2003/0182654 A1 * | 9/2003 | Dmitriev | ...................... | 717/151 |

FOREIGN PATENT DOCUMENTS

WO  0150250 A2  7/2001

OTHER PUBLICATIONS

Artho et al., "Subroutine Inlining and Bytecode Abstraction to Simplify Static and Dynamic Analysis", 2005, pp. 1-18, http://research.nii.ac.jp/~cartho/papers/inlining.pdf.
Viacava, "An Approach to Subroutine Elimination", pp. 1-26, retrieved Aug. 30, 2006. http://www.fing.edu.uy/inco/pedeciba/bibliote/reptec/TR0313.pdf.

* cited by examiner

*Primary Examiner* — John Chavis
(74) *Attorney, Agent, or Firm* — Yee & Associates, P.C.; Jill A. Poimboeuf

(57) ABSTRACT

A computer implemented method, apparatus, and computer usable program code for processing a class file. The class file is loaded onto a target device. A determination is made whether verification is enabled. Static constraints are checked in response to determining the verification is enabled. A determination is made whether subroutines are present in a set of methods within the class file. The subroutines are in-lined in response to determining that subroutines are present in the set of methods.

19 Claims, 3 Drawing Sheets

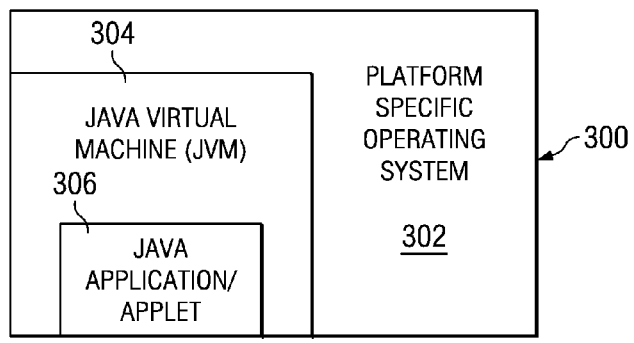
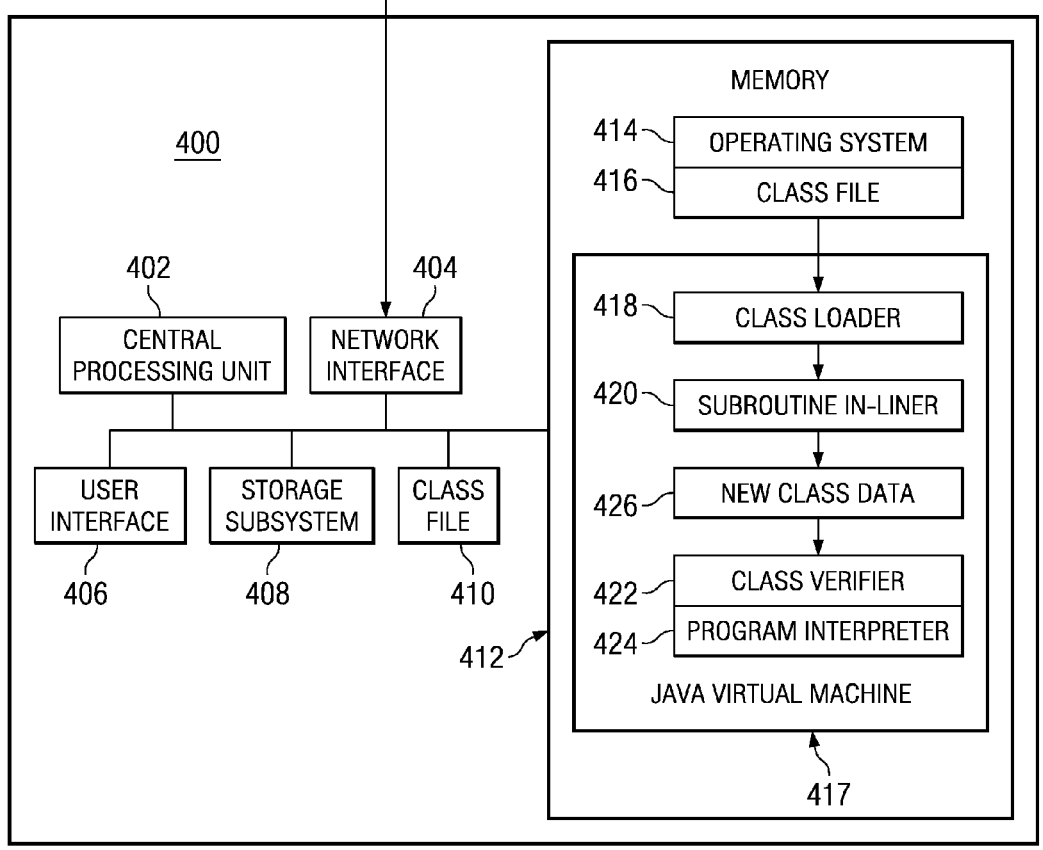

LOAD TIME IN-LINING OF SUBROUTINES

BACKGROUND OF THE INVENTION

1. Field of the Invention

The present invention relates generally to an improved data processing system and in particular to a computer implemented method and apparatus for in-lining Java™ subroutines. (Java and all Java-based trademarks are trademarks of Sun Microsystems, Inc. in the United States, other countries, or both.) Still more particularly, the present invention relates to a computer implemented method, apparatus, and computer usable program code for in-lining Java subroutines on a target device at load time.

2. Description of the Related Art

Java is an object-oriented programming language and environment focusing on defining data as objects and the methods that may be applied to those objects. The Java virtual machine (JVM) is a virtual computer component that resides only in memory. The JVM allows Java programs to be executed on different platforms as opposed to only the one platform for which the code was compiled. The Java virtual machine prescribes support for subroutines. Subroutines are used by Java compilers when a section of code must be executed from two or more paths in a particular method. In particular, Java compilers typically use subroutines to implement constructs, such as the finally clause of a 'try . . . finally . . . ' construct. Subroutines are implemented using any number of bytecodes, such as JSR, JSR_W, RET, and WIDE RET.

Unfortunately, subroutines contribute a significant amount of complexity to a Java virtual machine implementation. Areas of complexity include bytecode verification, Just-In-Time (JIT) compilation, and particularly liveness mapping for garbage collection. Subroutines make the flow analysis required for precise identification of object references very difficult, or in some cases, impossible.

In many cases, there are additional problems because subroutines from the subset of Java may not be supported on all devices, and newer versions of Java may only support subroutines for backwards compatibility or may not support subroutines at all. These problems cause difficulty because legacy applications will continue to use subroutines for the foreseeable future. One solution requires the Java virtual machine to have full support for subroutines which requires extensive memory and processing requirements. In another solution, applications must be run through a preprocessor using a separate application authoring-time system which removes JSR, JSR_W, RET, and WIDE RET bytecodes and in-lines the subroutines into each place where the subroutines are called. This process requires an additional build step and is not acceptable for many editions of Java used by various organizations.

SUMMARY OF THE INVENTION

The illustrative embodiments provide a computer implemented method, apparatus, and computer usable program code for processing a class file. The class file is loaded onto a target device. A determination is made whether subroutines are present in a set of methods within the class file. The subroutines are in-lined in response to determining that subroutines are present in the set of methods.

BRIEF DESCRIPTION OF THE DRAWINGS

The novel features believed characteristic of the illustrative embodiments are set forth in the appended claims. The illustrative embodiments, themselves, however, as well as a preferred mode of use, further objectives, and advantages thereof, will best be understood by reference to the following detailed description of an illustrative embodiment when read in conjunction with the accompanying drawings, wherein:

FIG. 3 is a block diagram illustrating the relationship of software components operating within a computer system in accordance with the illustrative embodiments;

FIG. 4 is a block diagram of a target system for performing load time in-lining of Java subroutines in accordance with the illustrative embodiments.

DETAILED DESCRIPTION OF THE PREFERRED EMBODIMENT

Figure 1:
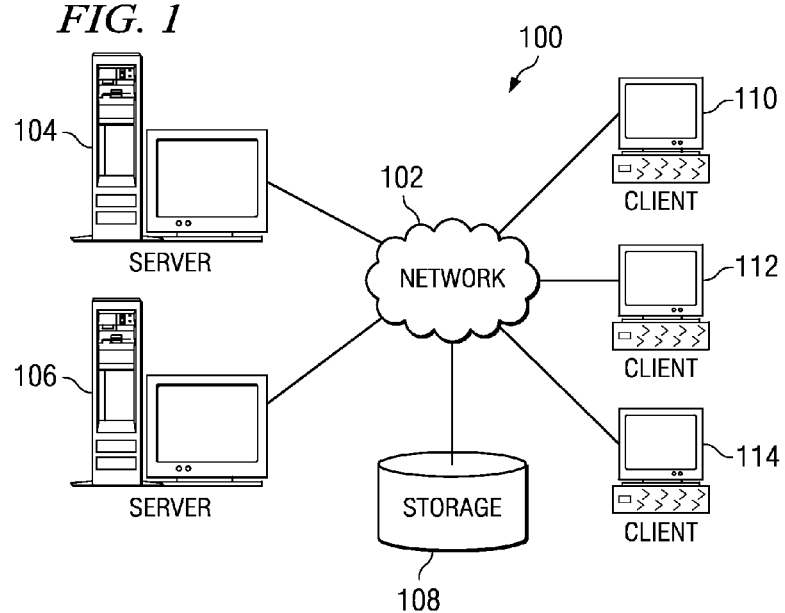
FIG. 1 is a pictorial representation of a data processing system in which the illustrative embodiments may be implemented.
Figure 2:
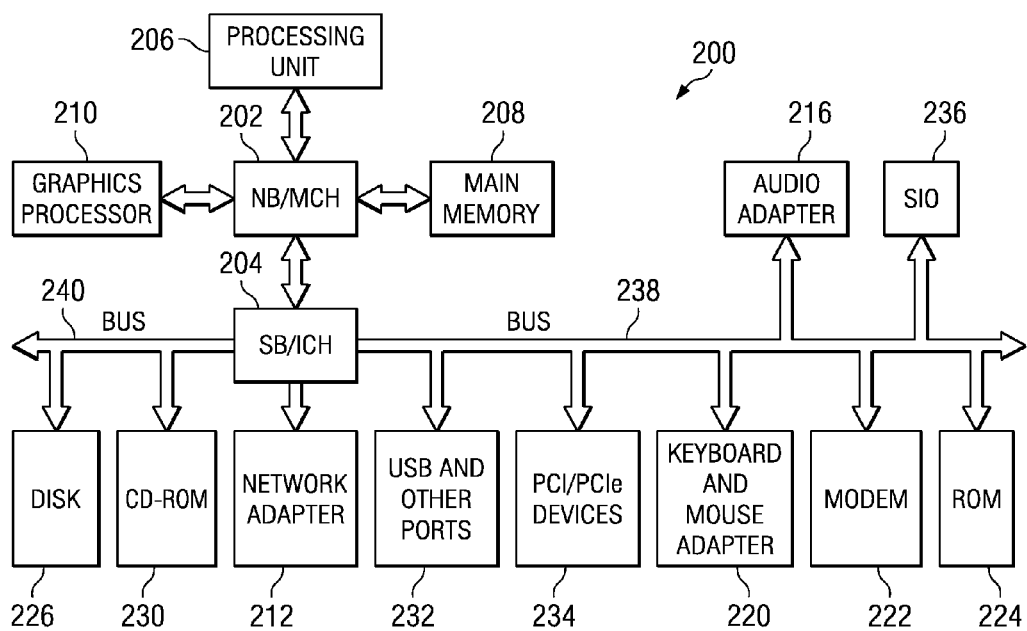
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 200.

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

With reference now to FIG. 3, a block diagram illustrating the relationship of software components operating within a computer system is depicted in accordance with the illustrative embodiments. Java-based system 300 contains platform specific operating system 302 that provides hardware and system support to software executing on a specific hardware platform. Java virtual machine 304 is one software application that may execute in conjunction with the operating system. Java virtual machine 304 provides a Java run-time environment with the ability to execute Java application/Applet 306, which is a program, servlet, or software component written in the Java programming language. The computer system in which Java virtual machine 304 operates may be similar to data processing system 200 of FIG. 2 or computer 100 of FIG. 1 described above. However, Java virtual machine 304 may be implemented in dedicated hardware on a so-called Java chip, Java-on-silicon, or Java processor with an embedded picoJava core.

At the center of a Java run-time environment is the Java virtual machine, which supports all aspects of Java's environment, including its architecture, security features, mobility across networks, and platform independence.

The Java virtual machine is a type of virtual computer, i.e. a computer that is specified abstractly. The specification defines certain features that every Java virtual machine must implement with some range of design choices that may depend upon the platform on which the Java virtual machine is designed to execute. For example, all Java virtual machines must execute Java bytecodes and may use a range of techniques to execute the instructions represented by the bytecodes. Bytecodes are an example of instructions that are non-specific with respect to a processor architecture used in a computer so that they may be used on any hardware platform. A virtual machine is used to execute these types of instructions. A Java virtual machine may be implemented completely in software or somewhat in hardware. This flexibility allows different Java virtual machines to be designed for mainframe computers and PDAs.

The Java virtual machine is the name of a virtual computer component that actually executes Java programs. Java programs are not run directly by the central processor but instead by the Java virtual machine, which is itself a piece of software running on the processor. The Java virtual machine allows Java programs to be executed on a different platform as opposed to only the one platform for which the code was compiled. Java programs are compiled for the Java virtual machine. In this manner, Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java run-time system. The Java compiler generates bytecode instructions that are nonspecific to particular computer architecture. A bytecode is a machine independent code generated by the Java compiler and executed by a Java interpreter. A Java interpreter is part of the Java virtual machine that alternately decodes and interprets a bytecode or bytecodes. These bytecode instructions are designed to be easy to interpret on any computer and easily translated on the fly into native machine code. Bytecodes may be translated into native code by a just-in-time compiler or JIT.

A Java virtual machine loads class files and executes the bytecodes within them. The class files are loaded by a class loader in the Java virtual machine. The class loader loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. Java virtual machines usually interpret bytecodes, but Java virtual machines may also use other techniques, such as just-in-time compiling to execute bytecodes.

When an application is executed on a Java virtual machine that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

The illustrative embodiments provide a computer implemented method, apparatus, and computer usable program code for in-lining Java subroutines at load time. As classes are loaded in the Java virtual machine, each class is quickly scanned to determine whether subroutines are present. If a class uses a subroutine, the target device in-lines the subroutine by generating new class data which is functionally equivalent to the original class without using subroutines. In-lining is an optimization which "expands" a function or subroutine call site into the actual implementation of the function which is called, rather than each call transferring control to a common piece of code. In the illustrative embodiments, a subroutine is replaced with the complete body of the subroutine in every context where that subroutine is used.

The virtual machine used by the illustrative embodiments is internally faster and simpler than a Java virtual machine with full support for subroutines. Unlike a preprocessor, the in-lining of subroutines is transparent to the developer and user. The illustrative embodiments provide a computer implemented method and apparatus for the Java virtual machine to isolate all of the complexity of subroutines to a single module in the runtime loader. This module may be removed for products that do not need support for subroutines instead of conditionally removing only selected handlers or suffering the size penalty for leaving the module in.

FIG. 4 is a block diagram of a target system for performing load time in-lining of Java subroutines in accordance with the illustrative embodiments. Target system 400 is a data processing system, such as data processing system 200 of FIG. 2. Target system 400 includes central processing unit 402, network interface 404, user interface 406, storage subsystem 408, class file 410 and memory 412. Memory 412 further stores operating system 414, class file 416, and Java virtual machine 417 including class loader 418, subroutine in-liner 420, class verifier 422, program interpreter 424, and new class data 426.

The illustrative embodiments are particularly different from existing solutions because in-lining is performed at load time on target system 400 rather than in advance on the authoring system. For example, target system 400 may be a personal computer or personal digital assistant that loads a specified class file. Central processing unit 402 is similar to processing unit 206 of FIG. 2. Network interface 404 may be similar to network adapter 212 of FIG. 2. Storage subsystem 408 and memory 412 may be part of storage elements, such as disk 226 and main memory 208 of FIG. 2. Class files 410 and 416 are Java .class files. Class file 416 is the in-memory version of class file 410. Class file 410 may be received from storage subsystem 408, another device through network interface 404 or a program application.

Operating system 414 is an operating system, such as platform specific operating system 302 of FIG. 3. Java virtual machine 417 is a virtual device, such as Java Virtual Machine 304 of FIG. 3. Class loader 418 is an object that is responsible for loading class file 416 into Java virtual machine 417. Class loader 418 may include a bytecode walker for scanning class file 416 for the presence of subroutines. Class verifier 422 verifies the bytecode of the class to verify that the requirements of the Java specification are complied with. Program interpreter 424 interprets the modified class data for allowing the data to be executed.

Class file 410 is loaded into Java virtual machine 417 by class loader 418. Class file 416 is scanned to determine whether class file 416 uses subroutines. Classes which do not use subroutines are ignored and may be loaded as quickly as possible. If class file 416 includes subroutines, new class data 426 is 'in-lined' or generated in memory 412 by subroutine in-liner 420. New class data 426, generated by subroutine in-liner 420, is functionally equivalent to the original class but does not use subroutines.

"Functionally equivalent" indicates that new class data 426, replacing the subroutine or subroutine call, is implemented in the same way the original subroutine would be implemented, achieving identical results and output. Subroutine in-liner 420 uses the subroutine to compute the arguments, store the arguments in variables corresponding to the subroutine's arguments, and then inserts the body of the subroutine at the call site. Determining whether subroutines are present is performed as a trivial addition to bytecode walking already performed by static verification of classes being loaded, resulting in virtually no measurable time penalty for detecting methods that require in-lining. Class verifier 422 performs structural verification of the new code generated by subroutine in-liner 420.

Figure 5:
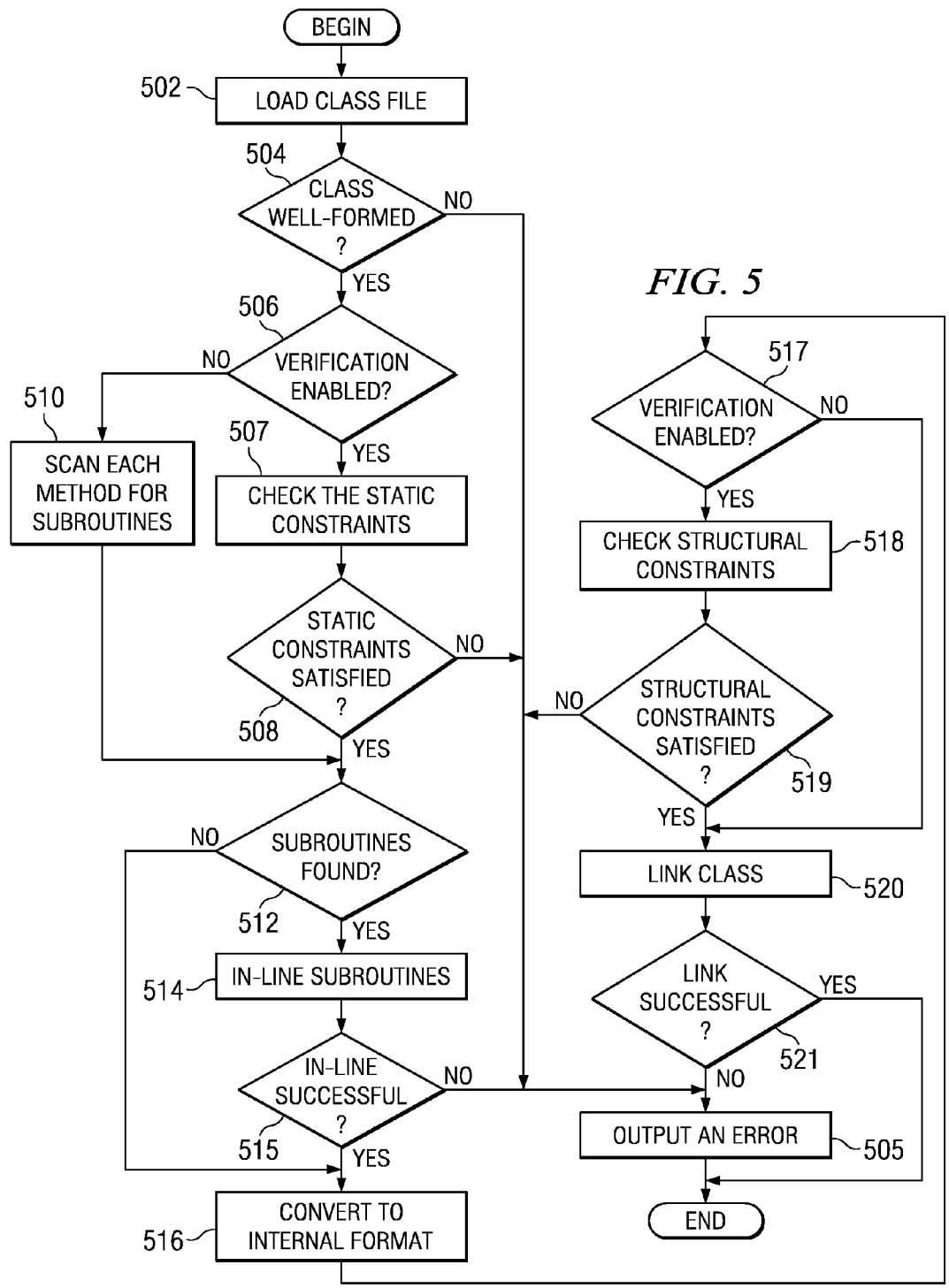
FIG. 5 is a flowchart of a process for load time in-lining on a target device in accordance with the illustrative embodiments.

FIG. 5 is a flowchart of a process for load time in-lining on a target device in accordance with the illustrative embodiments. The process in FIG. 5 is implemented in target system 400 by Java virtual machine 417 of FIG. 4. The process of FIG. 5 shows the process for a class file that is successfully loaded. In some examples, known problems may occur during the steps of FIG. 5 that lead to class failures or format, verify, memory, or other errors that terminate the process of FIG. 5. The process begins by loading a class file (step 502). The class file may be class file 410 of FIG. 4. The class file may be loaded by Java virtual machine 417 from network interface 404 and storage subsystem 408 all of FIG. 4 or may be dynamically generated by an application program, such as Java application/Applet 306 of FIG. 3.

Next, the process determines whether the class file is well-formed (step 504). During step 504, the class file is parsed to perform a static verification of the class data. Well-formedness indicates that the file is a valid class file including all of the required bytes. The determination of step 504 is performed by class loader 418 of FIG. 4. If the process determines the class file is not well-formed, the process outputs an error (step 505) with the process terminating thereafter. If the process determines the class file is well-formed in the determination of step 504, the process determines whether verification is enabled (step 506). For example, Java allows a user to set a command line parameter "-Xverify:none" through a user interface, such as user interface 406 of FIG. 4 that disables verification of the loaded class files. By default, verification is enabled. There is also the subtle distinction that class files located and loaded from the "bootclasspath" are not verified or scanned in step 510, whereas all classes loaded from the "classpath" are verified subject to the previous command line flag. The bootclasspath classes are the core set of classes, such as java/lang/Object, java/lang/Throwable, and so forth. These classes are assumed to be local to the target system and assumed to be safe.

Turning back to step 506, if the process determines verification is enabled, the process checks the static constraints (step 507). Next, the process determines whether the static constraints are satisfied (step 508). Static constraints are checked in step 507 to further validate the contents of class file 416 of FIG. 4. Class loader 418 of FIG. 4 parses the bytes to determine whether the file has the characteristics and shape of a valid class file. A static constraints check or verification is used to identify groups of bytes that correspond to portions of the class file format. Failures in this section are usually ClassFormatErrors. The static constraints are a more detailed check of the class file. The types of checks in this portion are checks within each class file component. They are typically scoped to identify problems by independently examining the components. A portion of the static constraint check includes checking for the branch targets as well as illegal/unrecognized bytecodes and other checks. Both the creation of the map for valid bytecodes offsets, and the linear walk of all the bytecodes examine all the bytecodes. Therefore, it is trivial to additionally check for the presence of jsr/ret bytecodes. If the process determines that static constraints are not satisfied in step 508, the process outputs an error (step 505) with the process terminating thereafter.

If the process determines verification is disabled in step 506, the process scans each method in the class for the presence of subroutines (step 510). During step 510, a code module within class loader 418 of FIG. 4 linearly walks the bytecodes to detect the presence of any subroutines as indicated by the presence of jsr/ret family bytecodes and records this information for the next pass. Next, the process determines whether the class file contains subroutines (step 512). The class loader determines whether subroutines are present based on the scan of step 510 or the static constraints check of step 508. Turning back to step 508, if the process determines that static constraints are satisfied, the process determines whether the class file contains subroutines (step 512).

If the process determines the class file contains subroutines, the process in-lines the subroutines (step 514). Step 514 is performed by subroutine in-liner 420 of FIG. 4. The in-lining of subroutines is only performed on loaded Java classes that contain method(s) with the relevant jsr, jsr_w, ret, or wide_ret bytecodes. Detection of the presence of these bytecodes is performed as a side effect of the static constraints check of step 507 or in the dedicated scan of step 510. Additionally, a separate record of the presence of any ret or wide_ret bytecodes may also be saved for use in an optimization within the subroutine in-lining process. All references to a ret bytecode includes both ret and wide_ret bytecodes. A jsr bytecode includes both jsr and jsr_w bytecodes.

During step 514, the process generates a new set of bytecodes, such as new class data 426 of FIG. 4 for each method in the class containing the subroutines. The new set of bytecodes includes modifying all the debug attributes, data, and other information for structural compliance with sections of the relevant Java virtual machine specification, such as Java Virtual Machine Specification, $2^{nd}$ Edition §4.8 Constraints on Java Virtual Machine Code. The original bytecodes are divided into simple superblocks delineated by any state change in the original code. These state changes include: conditional branches, unconditional branches, code termination, switch bytecodes, and the subroutine bytecodes. The internal data of the bytecodes are further simplified by also including exception range starts and ends, local variable table ranges starts and ends, local variable type table starts and ends, and line number table offsets as state change points.

The original bytecodes are divided into superblocks at the extra points to simplify the recreation of the debug data after the in-lining. For example, if there were two or more line number attributes assigned to two or more offsets with the superblock, then the effort to find if a line number attribute is in a given block requires either:

1. connecting the line number attribute to each copy of the block since it may be replicated as a result of in-lining using more memory for the linking pointers to link zero or more entries, or 2. range checking each line number attribute against the block to see if the line number is contained within the block requiring two compares per block. Dividing the blocks at line number attributes requires only a simple, single compare of the line number attribute against block start offset.

The result of splitting up the code is that the superblocks are laid out once all the execution paths are determined. The subroutine sub-trees of blocks are output once for each path that uses them. The next pass updates all the offsets for branch instructions to jump to the correct bytecode. The final pass involves updating all the exception ranges, local variable types, and line number tables.

Next, the process determines whether the in-line is successful (step 515). The process of in-lining bytecodes may detect errors relating to jsr/ret family bytecode usage such as using a local variable for the ret address that does not contain a valid ret address. If the process determines the in-line is not successful, the process outputs an error (step 505) with the process terminating thereafter. Any in-lining related errors are checked for in step 515.

If the process determines the in-line is successful in step 515, the process converts the bytecodes to an internal format (step 516). If subroutines are not found in step 512, the process converts the bytecodes to an internal format (step 516). Next, the process determines whether verification is enabled (step 517). The determination of step 517 is performed using logic similar to that of step 506. If the process determines verification is enabled, the process checks structural constraints (step 518). During step 518, the loaded classes are verified using existing algorithms by class verifier 422 of FIG. 4. In step 518, the process checks structural constraints by examining the class file components as a whole in relation to other class files. For example, the bytecodes are examined by performing a data flow analysis that verifies the parameters for each bytecode and checks for stack over/underflow. Most of the checks typically require a large amount of work.

Next, the process determines whether structural constraints are satisfied (step 519). If the process determines that structural constraints have been violated, the process outputs an error (step 505) with the process terminating thereafter. If the process determines that structural constraints are satisfied in step 519, the process links the class (step 520). If the process determines verification is not enabled in step 517, the process links the class (step 520). During step 520, the process initializes the loaded class for execution.

Next, the process determines whether the link is successful (step 521). If the link is successful, the process terminates. If the process determines the link is not successful, the process outputs an error (step 505) with the process terminating thereafter.

The process in FIG. 5 is one illustrative embodiment of a process that may be used to in-line subroutines. The following alternatives and deviations may also be used to effectively in-line subroutines on a target device at load time. For example, the illustrative embodiments may use an internal representation that allows a method in-lined in step 514 to exceed the 64 K bytecode limitation of the original class file representation. The in-line process of step 514 may cause significant growth in method size for some pathological class files with subroutines. In another illustrative embodiment, the in-lined methods may be hard limited to the 64K of bytecodes and report an error when the limit is exceeded, resulting in the rejection of class files that execute on the reference implementation.

In one illustrative embodiment, step 512 may use the results of a bytecode walk performed as part of class loading to detect and record the presence of subroutines at both the class and individual method level. Using a bytecode walk results in only attempting to in-line classes that actually contain subroutines. Alternatively, all methods encountered may be in-lined or detected in a separate pass.

Subroutines are in-lined in step 514 after the static constraints check to reduce the number of error conditions that need to be checked during the in-lining. Alternatively, in-lining may be performed prior to checking static constraints for simplicity. The in-lining step of step 514 is performed before the structural verification is checked in step 518 to reduce the complexity of the class verifier relating to data flow analysis of the methods. Alternatively, subroutines may be in-lined after the bytecodes are converted to an internal format.

During step 514, the process checks for several data flow analysis related errors during in-lining as they would either be hidden/removed by the in-lining or would possibly cause errors during the in-lining itself. These errors are reported in step 515. Alternatively, the level of checking necessary to in-line correctly and without failing in the presence of invalid class files is related to the timing. The later the in-lining is performed, the fewer extra checks are required.

The new set of bytecodes generated during in-lining handle all classes and identify faults so that all errors are reported during verification and Java compliance kit (JCK) testing.

The requirements for in-lining Java subroutines at load time include detection of a subset of verification failures relating to subroutine structure and other verification checks necessary to safely and correctly inline the subroutines. The in-lining may verify that Java specifications regarding constraints including type and number of arguments, variables, operand stack growth, return address, execution, blocks, boundaries, data structures, instruction usage, and other requirements are fulfilled as specified. The result of in-lining can lead to a larger instruction array than the original code.

The illustrative embodiments allow the internal representation of the class file to exceed the 64K limit imposed by different Java specifications.

There are three optimizations performed by the process that are additions to the exemplary implementation described above. They are as follows:

1. If a jsr basic block (output as an aconst_null) is followed by a basic block starting with an astore family bytecode, then remove the aconst_null and the astore family bytecodes;
2. If a ret basic block (output as a goto) is followed by the basic block that is the target of the goto, then remove the goto bytecode; and
3. If the method does not contain any ret bytecodes, then do not nest the subroutine state as it cannot be unnested.

Thus, the illustrative embodiments provide a computer implemented method, apparatus, and computer usable program code for in-lining Java subroutines at load time. As classes are loaded in the Java virtual machine, each class is quickly scanned to determine whether subroutines are present. If a class uses a subroutine, the target device in-lines the subroutine by generating new class data which is functionally equivalent to the original class without using subroutines. Unlike a preprocessor, the in-lining of subroutines is transparent to the developer and user. Classes which do not use subroutines are ignored and may be loaded as quickly as possible. Classes which use subroutines are processed in a way to minimize memory and time requirements. Errors in the original class are not hidden by the transformation. The illustrative embodiments allow a virtual machine to internally process subroutines without interaction by a developer or user.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from at least one computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing a class file, the computer implemented method comprising:
    loading the class file onto a target device;
    determining whether verification is enabled;
    responsive to determining the verification is enabled, checking static constraints;
    determining whether subroutines are present in a set of methods within the class file; and
    responsive to determining that the subroutines are present in the set of methods, in-lining the subroutines.

2. The computer implemented method of claim 1, wherein the loading, determining, and in-lining steps are performed by a virtual machine.

3. The computer implemented method of claim 1, further comprising:
    parsing the class file to perform structural verification ensuring that the class file is a valid class file.

4. The computer implemented method of claim 1, wherein the in-lining step further comprises:
    generating a new set of bytecodes for the subroutines.

5. The computer implemented method of claim 4, wherein the in-lining step further comprises:
    generating the new set of bytecodes not limited to 64 k bytes; and
    executing the new set of bytecodes.

6. The computer implemented method of claim 4, wherein the new set of bytecodes is functionally equivalent to the class file.

7. The computer implemented method of claim 1, further comprising:
    responsive to determining the verification is not enabled, scanning each method in the class file for the subroutines.

8. The computer implemented method of claim 4, wherein verification errors present in the class relating to the subroutines are reported and other verification errors present in the new set of bytecodes are to be discovered by a bytecode verifier.

9. A data processing system comprising:
    a bus system;
    a communications system connected to the bus system;
    a memory connected to the bus system, wherein the memory includes a set of instructions; and
    a processing unit connected to the bus system, wherein the processing unit executes the set of instructions for a virtual machine, wherein the virtual machine loads a class file, determines whether verification is enabled, checks static constraints in response to determining the verification is enabled, determines whether subroutines are present in a set of methods within the class file, and in-lines the subroutines in response to a determination that the subroutines are present in the set of methods.

10. The system of claim 9, wherein the data processing system is a target system.

11. The system of claim 9, wherein the set of instructions are executed at load time.

12. The system of claim 9, wherein the virtual machine includes a class loader, subroutine in-liner, class verifier, and program interpreter for implementing the set of instructions.

13. The system of claim 9, wherein the subroutines are in-lined to generate a new set of bytecodes that are functionally equivalent to the class file.

14. The system of claim 9, further comprising a network interface for receiving the class file through a network.

15. A computer program product for processing a class file, the computer program product comprising:
    set of computer readable storage devices;
    program code, stored on at least one of the set of computer readable storage devices, for loading a class file onto a target device;
    program code, stored on at least one of the set of computer readable storage devices, determining whether verification is enabled;
    program code, stored on at least one of the set of computer readable storage devices, responsive to determining the verification is enabled, checking static constraints;
    program code, stored on at least one of the set of computer readable storage devices, for determining whether subroutines are present in a set of methods within the class file; and
    program code, stored on at least one of the set of computer readable storage devices, responsive to determining that the subroutines are present in the set of methods, for in-lining the subroutines.

16. The computer program product of claim 15, wherein the program code for in-lining the subroutines comprises:
    program code, stored on at least one of the set of computer readable storage devices, for generating a new set of bytecodes for the subroutines, wherein the new set of bytecodes is not limited to 64 k bytes.

17. The computer program product of claim 15 further comprising:
    program code, stored on at least one of the set of computer readable storage devices, for parsing the class file to perform structural verification ensuring that the class file is a valid class file.

18. The computer program product of claim 15 further comprising:
    program code, stored on at least one of the set of computer readable storage devices, responsive to determining the verification is not enabled, for scanning each method in the class file for the subroutines.

19. A system for processing a class file, the system comprising:
    a means for loading the class file onto a target device;
    a means for determining whether verification is enabled;
    a means for checking, responsive to determining the verification is enabled, static constraints;
    a means for determining whether subroutines are present in a set of methods within the class file; and
    a means for in-lining, responsive to determining that the subroutines are present in the set of methods, the subroutines.

* * * * *